United States Patent
Wilt et al.

(10) Patent No.: US 12,361,909 B2
(45) Date of Patent: *Jul. 15, 2025

(54) VIRTUALIZING GRAPHICS PROCESSING IN A PROVIDER NETWORK

(71) Applicant: Amazon Technologies, Inc., Seattle, WA (US)

(72) Inventors: Nicholas Patrick Wilt, Mercer Island, WA (US); Ashutosh Tambe, Bellevue, WA (US); Nathan Lee Burns, Mountain View, CA (US); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,785

(22) Filed: Oct. 8, 2021

(65) Prior Publication Data

US 2022/0028351 A1 Jan. 27, 2022

Related U.S. Application Data

(63) Continuation of application No. 14/822,511, filed on Aug. 10, 2015, now Pat. No. 11,145,271.

(51) Int. Cl.
*G09G 5/00* (2006.01)
*G06F 9/50* (2006.01)
(Continued)

(52) U.S. Cl.
CPC ........... *G09G 5/003* (2013.01); *G06F 9/5044* (2013.01); *G06F 9/5072* (2013.01);
(Continued)

(58) Field of Classification Search
CPC . G06T 1/20; G06T 1/60; G06F 9/5044; G06F 9/5072; G06F 9/5077
See application file for complete search history.

(56) References Cited

U.S. PATENT DOCUMENTS 8,261,295 B1 9/2012 Risbood et al.
9,069,622 B2 6/2015 Post et al.
(Continued)

FOREIGN PATENT DOCUMENTS

CN 102446114 5/2012
CN 102915285 2/2013
(Continued)

OTHER PUBLICATIONS

Installing VMwae VGPU on vSphere 6.0, Mar. 7, 2015 (Year: 2015).*

(Continued)

*Primary Examiner* — Ming Wu
(74) *Attorney, Agent, or Firm* — Robert C. Kowert; Kowert, Hood, Munyon, Rankin & Goetzel, P.C.

(57) ABSTRACT

Methods, systems, and computer-readable media for virtualizing graphics processing in a provider network are disclosed. A virtual compute instance is provisioned from a provider network. The provider network comprises a plurality of computing devices configured to implement a plurality of virtual compute instances with multi-tenancy. A virtual GPU is attached to the virtual compute instance. The virtual GPU is implemented using a physical GPU, and the physical GPU is accessible to the virtual compute instance over a network. An application is executed using the virtual GPU on the virtual compute instance. Executing the application generates virtual GPU output that is provided to a client device.

20 Claims, 7 Drawing Sheets

(51) Int. Cl.
  *G06T 1/20* (2006.01)
  *G06T 1/60* (2006.01)
(52) U.S. Cl.
  CPC .............. *G06F 9/5077* (2013.01); *G06T 1/20* (2013.01); *G06T 1/60* (2013.01); *G09G 2370/022* (2013.01)

(56) References Cited

U.S. PATENT DOCUMENTS

| | | | |
|---|---|---|---|
| 9,098,323 | B2 | 8/2015 | Mitra et al. |
| 11,145,271 | B2 | 10/2021 | Wilt et al. |
| 2002/0194499 | A1* | 12/2002 | Audebert ............ H04L 63/0853 726/35 |
| 2003/0007002 | A1* | 1/2003 | Hida ...................... G06T 11/206 715/734 |
| 2004/0054994 | A1* | 3/2004 | Demsey .............. G06F 9/45516 717/148 |
| 2007/0033156 | A1 | 2/2007 | Limpert et al. |
| 2007/0283358 | A1 | 12/2007 | Kasahara et al. |
| 2008/0034365 | A1 | 2/2008 | Dahlstedt |
| 2011/0083131 | A1 | 4/2011 | Pirzada et al. |
| 2011/0102443 | A1* | 5/2011 | Dror ........................ G06T 1/20 345/522 |
| 2011/0134111 | A1 | 6/2011 | Stone |
| 2011/0164046 | A1 | 7/2011 | Niederauer |
| 2011/0182422 | A1 | 7/2011 | Anderson et al. |
| 2012/0069032 | A1 | 3/2012 | Hansson et al. |
| 2012/0154389 | A1* | 6/2012 | Bohan ................... G06F 9/5072 345/419 |
| 2013/0275974 | A1 | 10/2013 | Cao et al. |
| 2014/0055466 | A1 | 2/2014 | Petrov et al. |
| 2014/0169471 | A1 | 6/2014 | He |
| 2014/0176583 | A1 | 6/2014 | Abiezzi et al. |
| 2014/0181806 | A1 | 6/2014 | Abiezzi et al. |
| 2014/0215462 | A1 | 7/2014 | Kuo et al. |
| 2014/0286390 | A1 | 9/2014 | Fear |
| 2015/0067672 | A1 | 3/2015 | Mitra et al. |
| 2015/0097844 | A1 | 4/2015 | Wankhede et al. |
| 2015/0105148 | A1 | 4/2015 | Consul et al. |
| 2015/0116335 | A1 | 4/2015 | Chen et al. |
| 2015/0220354 | A1* | 8/2015 | Nair ........................ G06F 13/28 710/308 |
| 2015/0221063 | A1 | 8/2015 | Kim et al. |
| 2015/0370589 | A1* | 12/2015 | Bidarkar ............. G06F 12/0802 718/1 |
| 2015/0370620 | A1 | 12/2015 | Lai et al. |
| 2015/0371355 | A1 | 12/2015 | Chen |
| 2016/0239333 | A1 | 8/2016 | Cowperthwaite et al. |
| 2016/0247248 | A1 | 8/2016 | Ha et al. |
| 2017/0004808 | A1 | 1/2017 | Agashe et al. |

FOREIGN PATENT DOCUMENTS

| | | |
|---|---|---|
| CN | 103530170 A | 1/2014 |
| CN | 104620222 A | 5/2015 |
| JP | 2014500535 | 1/2014 |
| KR | 101401523 | 6/2014 |
| WO | 2014100558 | 6/2014 |

OTHER PUBLICATIONS

Herrera, Alex, "NVIDIA Grid vGPU: Delivering Scalable Graphics-Rich Virtual Desktops," Jun. 1, 2015, pp. 1-8, retrieved from Internet: URL:https://images.nvidia.com/content/pdf/grid/whitepaper/NVIDIA-GRID-WHITEPAPER-vGPU-Delivering-Scalable-Graphics-Rich-Virtual-Desktops.pdf.

Nice, "DCV Administration Guide," NICE s.r.l, Asti, Italy, Jul. 2015, Source: https://www.nice-software.com/download/nice-dcv-2014#documentation, pp. 1-96.

U.S. Appl. No. 15/178,292, filed Jun. 9, 2016, Nicholas Patrick Wilt.
U.S. Appl. No. 15/177,255, filed Jun. 8, 2016, Nicholas Patrick Wilt.
U.S. Appl. No. 15/177,262, filed Jun. 8, 2016, Nicholas Patrick Wilt.
Federico Silla. "The rCUDA technology: an inexpensive way to improve the performance of GPU-based clusters." Talk at Computer Engineering Laboratory, Delft University of Technology. Delft, Netherlands. Apr. 2015, pp. 1-47.
U.S. Appl. No. 14/938,457, filed Nov. 11, 2015, Nicholas Patrick Wilt et al.
U.S. Appl. No. 14/938,461, filed Nov. 11, 2015, Nicholas Patrick Wilt et al.
U.S. Appl. No. 14/938,656, filed Nov. 11, 2015, Nicholas Patrick Wilt et al.
U.S. Appl. No. 14/938,654, filed Nov. 11, 2015, Nicholas Patrick Wilt et al.
Office Action mailed Jun. 15, 2021 in Chinese Patent Application No. 201680046844.7, Amazon Technologies, Inc., pp. 1-21.
Office Action from Canada Application No. 2994701, dated Nov. 27, 2019, (Amazon Technologies, Inc.), pp. 1-3.
U.S. Appl. No. 15/686,085, filed Aug. 24, 2017, Gianpaolo Ingegneri.
International Search Report and Written Opinion from PTC/US2016/046339, Date of mailing Nov. 17, 2016, Amazon Technologies, Inc., pp. 1-13.
Jeff Weiss, et al., "NVIDIA Grid VCPU Deployment Guide for VMWARE Horizon 6.1", NVIDIA TechPub, Mar. 1, 2015, Retrieved from URL: http://www.vmware.com/content/dam/digitalmarketing/vmware/en/pdf/products/horizon/grid-vgpu-deployement-guide.pdf, pp. 1-14.
Lin Shi, et al., "vCUDA: GPU-Accelerated High-Performance Computing in Virtual Machines", IEEE Transaction on Computers, vol. 61, No. 6, Jun. 2012, pp. 804-816.
Matthew Danish, et al., "Virtual-CPU Scheduling in the Quest Operating System", 2011 17th IEEE Real-Time and Embedded Technology and Application Symposium, Apr. 11, 2011, pp. 169-179.
Mark Panahi, et al., "A Framework for Real-Time Service-Oriented Architecture", 2009 IEEE Conference on Commerce and Enterprise Computing (CED '09), Jul. 20, 2009, pp. 460-467.
Marcos D. Assuncao, et al., "CloudAffinity: A Framework For Matching Servers to Cloudmates", 2012 IEEE Network Operations and Management Symposium (NOMS 2012), Apr. 16-20, 2012, pp. 213-220.
Shinpei Kato, et al., "Gdev: First-Class GPU Resource Management in the Operating System", Jun. 1, 2012, Retrieved from URL: https://www.usenix.org/system/files/conference/atc12/atc12-final1319.pdf, pp. 1-12.
Office Action from Korean Application No. 10-2018-7006659, dated Feb. 20, 2019, (English Translation and Korean Version), pp. 1-12.
U.S. Appl. No. 15/249,150, filed Aug. 26, 2016, Ingegneri.
U.S. Appl. No. 15/374,509, filed Dec. 9, 2016, Featonby, et al.
U.S. Appl. No. 15/417,064, filed Jan. 26, 2017, Featonby, et al.
U.S. Appl. No. 15/439,751, filed Feb. 22, 2017, Surani, et al.
Antonio J. Pena, et al., "A Complete and Efficient CUDA-Sharing Solution for HPC Clusters", Sep. 2, 2014, Retrieved from the Internet: URL: http://www.mcs.anl.gov/papers/P5137-0514.pdf, pp. 1-28.
Notice of Allowance from Japanese Application No. 9-5-2020-052019612, dated Jul. 30, 2020, (Japanese version), pp. 1-2.
U.S. Appl. No. 15/470,821, filed Mar. 27, 2017, Malcolm Featonby, et al.
Murtijn Smit, "Installing VMware vGPU on vSphere 6.0", Mar. 7, 2015, pp. 1-10 (Year 2015).
Official Communication mailed Sep. 8, 2022 in European Patent Application No. 16754082.2, pp. 1-7.
Steve Crago, et al., "Heterogeneous cloud computing," In 2011 IEEE International Conference on Cluster Computing, , Sep. 2011, pp. 378-385, IEEE.
Kittisak Sajjapongse et al., "A Preemption-based Runtime to Efficiently Schedule Multiprocess Applications on Heterogeneous Clusters with GPUs," High-Performance Parallel and Distributed Computing 2013 (HPDC'13), Jun. 17-21, 2013, pp. 179-190, New York, NY, USA.

(56) References Cited

OTHER PUBLICATIONS

Alexander M. Merritt, et al., "Shadowfax: Scaling in Heterongeneous Cluster Systems via GPGPU Assemblies", Virtualization Technologies in Distributed Computing (VTDM '11), ACM, Jun. 8, 2011, pp. 3-10, San Jose, California, USA.

Dipanjan Sengupta, et al., "Scheduling Multi-tenant Cloud Workloads on Accelerator-based Systems", SC14: International Conference for High Performance Computing, Networking, Storage and Analysis, IEEE Computer Society, Nov. 16, 2014, pp. 513-524.

Jiadong Wu, et al., "Dynamic Kernel/Device Mapping Strategies for GPU-assisted HPC Systems", 16th Workshop on Job Scheduling Strategies for Parallel Processing, May 25, 2012, pp. 1-18, Shanghai, China.

Alexander Merritt, et al., "Slices: Provisioning Heterogeneous HPC Systems", XSEDE '14, ACM, Jul. 13, 2014, pp. 1-8, New York, NY, USA.

Palden Lama, et al., "pVOCL: Power-Aware Dynamic Placement and Migration in Virtualized GPU Environments", 2013 IEEE 33rd International Conference on Distributed Computing Systems, IEEE Computer Society, Jul. 8, 2013, pp. 145-154.

Fabio Lopez Pires, et al., "A Virtual Machine Placement Taxonomy", 2015 15th IEEE/ACM International Symposium on Cluster, Cloud and Grid Computing, IEEE Computer Society, May 4, 2015, pp. 159-168.

Summons mailed Mar. 3, 2022 in European Patent Application No. 16754082.2.

"Amazon Elastic Compute Cloud User Guide for Linux," Sep. 5, 2015, Retrieved from the Internet: URL:https://web.archive.org/web/20150905094533if_/http://docs.aws.amazon.com/AWSEC2/latest/UserGuide/ec2-ug.

Sun Changchun, "HPC cloud applied to lattice optimization," Lawrence Berkeley National Laboratory, Apr. 1, 2011, (XP055914650), pp. 1-6.

Rabbani Md, "Resource Management in Virtualized Data Center," A Thesis presented to the University of Waterloo, (C)Md Rabbani 2014, Feb. 21, 2014 (XP093140878), pp. 1-72.

Rabboni Md Golam, et al., "On tackling virtual data center embedding problem," 2013 IFIP/IEEE International Symposium on Integrated Network Management (IM 2013), May 1, 2013, pp. 177-184 (XP093140867).

Teyeb, Hanna, et al., "Traffic-aware virtual machine placement in geographically distributed clouds," 2014 International Conference on Control, Decision and Information Technologies, IEEE, Nov. 3, 2014, pp. 24-29 (XP032714291).

* cited by examiner

VIRTUALIZING GRAPHICS PROCESSING IN A PROVIDER NETWORK

This application is a continuation of U.S. patent application Ser. No. 14/822,511, filed Aug. 10, 2015, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for virtualizing graphics processing in a provider network are described. Using the techniques described herein, a virtual compute instance may be provisioned with an attached virtual graphics processing unit (GPU) to provide accelerated graphics processing. The virtual GPU may be selected from a set of virtual GPUs (or virtual GPU classes) having different capabilities for graphics processing. The virtual compute instance may also be selected from a set of virtual compute instances (or instance types) having different computational and/or memory resources. The virtual GPU may be implemented using a physical GPU that is connected to the virtual compute instance over a network. The virtual compute instance may be implemented using a physical compute instance that includes an interface device. The interface device may include a network interface and a custom hardware interface that emulates a GPU. The interface device may appear as the virtual GPU to the virtual compute instance, and the virtual compute instance may use the interface device to offload graphics processing to the physical GPU over the network.

Figure 1:
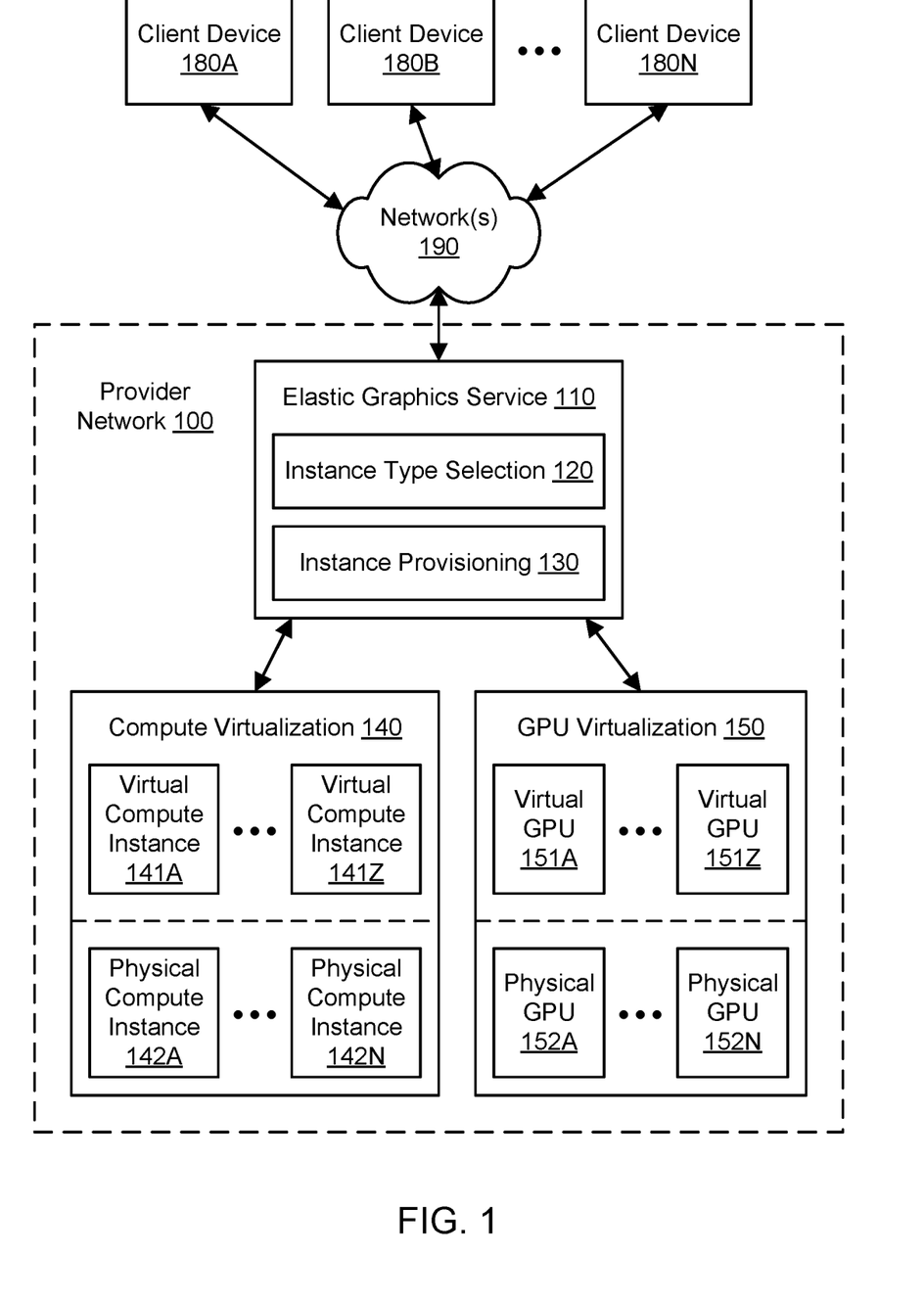
FIG. 1 illustrates an example system environment for virtualizing graphics processing in a provider network, according to one embodiment.

FIG. 1 illustrates an example system environment for virtualizing graphics processing in a provider network, according to one embodiment. Clients of a provider network 100 may use computing devices such as client devices 180A-180N to access an elastic graphics service 110 and other resources offered by the provider network. The client devices 180A-180N may be coupled to the provider network 100 via one or more networks 190. The provider network 100 may provide compute virtualization 140 such that a plurality of virtual compute instances 141A-141Z may be implemented using a plurality of physical compute instances 142A-142N. The virtual compute instances 141A-141Z may also be referred to herein as virtual machines (VMs). Similarly, the provider network 100 may provide GPU virtualization 150 such that a plurality of virtual GPUs 151A-151Z may be implemented using a plurality of physical GPUs 152A-152N. An example hardware architecture for implementing virtual GPUs using physical GPUs is discussed with reference to FIG. 5. The underlying physical compute instances 142A-142N may be heterogeneous, and the underlying physical GPUs 152A-152N may be heterogeneous as well. In one embodiment, the compute virtualization 140 may use techniques for multi-tenancy to provision virtual compute instances 141A-141Z that exceed the physical compute instances 142A-142N in number. In one embodiment, the GPU virtualization 150 may use techniques for multi-tenancy to provision virtual GPUs 151A-151Z that exceed the physical GPUs 152A-152N in number.

The elastic graphics service 100 may offer, to clients, selection and provisioning of virtualized compute instances with attached virtualized GPUs. Accordingly, the elastic graphics service 100 may include an instance type selection functionality 120 and an instance provisioning functionality 130. In one embodiment, the provider network 100 may offer virtual compute instances 141A-141Z with varying computational and/or memory resources. In one embodiment, each of the virtual compute instances 141A-141Z may correspond to one of several instance types. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, an instance type may be selected for a client, e.g., based (at least in part) on input from the client. For example, a client may choose an instance type from a predefined set of instance types. As another example, a client may specify the desired resources of an instance type, and the instance type selection functionality 120 may select an instance type based on such a specification.

In one embodiment, the provider network 100 may offer virtual GPUs 151A-151Z with varying graphics processing capabilities. In one embodiment, each of the virtual GPUs 151A-151Z may correspond to one of several virtual GPU classes. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, a virtual GPU class may be selected for a client, e.g., based (at least in part) on input from the client. For example, a client may choose a virtual GPU class from a predefined set of virtual GPU classes. As another example, a client may specify the desired resources of a virtual GPU class, and the instance type selection functionality 120 may select a virtual GPU class based on such a specification.

Therefore, using the instance type selection functionality 120, clients (e.g., using client devices 180A-180N) may specify requirements for virtual compute instances and virtual GPUs. The instance provisioning functionality 130 may provision virtual compute instances with attached virtual GPUs based on the specified requirements (including any specified instance types and virtual GPU classes). As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client. For a particular client, a virtual compute instance may be provisioned of the instance type selected by or for the client, and the virtual compute instance may be provisioned with an attached virtual GPU of the GPU class selected by or for the client. In one embodiment, a virtual GPU of substantially any virtual GPU class may be attached to a virtual compute instance of substantially any instance type.

The provider network 100 may be set up by an entity such as a company or a public sector organization to provide one or more services (such as various types of cloud-based computing or storage) accessible via the Internet and/or other networks to client devices 180A-180N. Provider network 100 may include numerous data centers hosting various resource pools, such as collections of physical and/or virtualized computer servers, storage devices, networking equipment and the like (e.g., implemented using computing system 3000 described below with regard to FIG. 6), needed to implement and distribute the infrastructure and services offered by the provider network 100. In some embodiments, provider network 100 may provide computing resources, such as compute virtualization service 140 and GPU virtualization service 150; storage services, such as a block-based storage service, key-value based data stores, or various types of database systems; and/or any other type of network-based services. Client devices 180A-180N may access these various services offered by provider network 100 via network(s) 190. Likewise, network-based services may themselves communicate and/or make use of one another to provide different services. For example, computing resources offered to client devices 180A-180N in units called "instances," such as virtual or physical compute instances or storage instances, may make use of particular data volumes, providing virtual block storage for the compute instances. The provider network 100 may implement or provide a multi-tenant environment such that multiple clients (e.g., using client devices 180A-180N) may access or use a particular resource in a substantially simultaneous manner.

As noted above, compute virtualization service 140 may offer various virtual compute instances 141A-141Z to client devices 180A-180N. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of the compute virtualization service 140 in different embodiments, including general purpose or special purpose computer servers, storage devices, network devices and the like. In some embodiments, client devices 180A-180N or other any other user may be configured (and/or authorized) to direct network traffic to a virtual compute instance. In various embodiments, virtual compute instances 141A-141Z may attach or map to one or more data volumes provided by a storage service in order to obtain persistent storage for performing various operations. Using the techniques described herein, virtual GPUs 151A-151Z may be attached to virtual compute instances 141A-141Z to provide graphics processing for the virtual compute instances.

Virtual compute instances 141A-141Z may operate or implement a variety of different platforms, such as application server instances, Java™ virtual machines (JVMs) or other virtual machines, general purpose or special-purpose operating systems, platforms that support various interpreted or compiled programming languages such as Ruby, Perl, Python, C, C++ and the like, or high-performance computing platforms) suitable for performing client applications, without for example requiring the client devices 180A-180N to access an instance. In some embodiments, virtual compute instances 141A-141Z may have different instance types or configurations based on expected uptime ratios. The uptime ratio of a particular virtual compute instance may be defined as the ratio of the amount of time the instance is activated to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and the client may pay a discounted hourly usage fee in accordance with the associated pricing policy. If the client expects to have a steady-state workload that requires an instance to be up most of the time, then the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Virtual compute instance configurations may also include virtual compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). In some embodiments, particular instance types for virtual compute instances may be associated with default classes for virtual GPUs. For example, some instance types may be configured without a virtual GPU as a default configuration, while other instance types designated for graphics intensive workloads may be designated with particular virtual GPU classes as a default configuration. Configurations of virtual compute instances may also include their location in a particular data center or availability zone, geographic location, and (in the case of reserved compute instances) reservation term length.

The client devices 180A-180N may represent or correspond to various clients or users of the provider network 100, such as customers who seek to use services offered by the provider network. The clients, users, or customers may represent persons, businesses, other organizations, and/or other entities. The client devices 180A-180N may be distributed over any suitable locations or regions. Each of the client devices 180A-180N may be implemented using one or more computing devices, any of which may be implemented by the example computing device 3000 illustrated in FIG. 6.

The client devices 180A-180N may encompass any type of client configurable to submit requests to provider network 100. For example, a given client device may include a suitable version of a web browser, or it may include a plug-in module or other type of code module configured to execute as an extension to or within an execution environment provided by a web browser. Alternatively, a client device may encompass an application such as a database application (or user interface thereof), a media application, an office application, or any other application that may make use of virtual compute instances, storage volumes, or other network-based services in provider network 100 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, client devices 180A-180N may be configured to generate network-based service requests according to a Representational State Transfer (REST)-style network-based services architecture, a document- or message-based network-based services architecture, or another suitable network-based services architecture. In some embodiments, client devices 180A-180N (e.g., a computational client) may be configured to provide access to a virtual compute instance in a manner that is transparent to applications implement on the client device utilizing computational resources provided by the virtual compute instance. In at least some embodiments, client devices 180A-180N may provision, mount, and configure storage volumes implemented at storage services for file systems implemented at the client devices.

Client devices 180A-180N may convey network-based service requests to provider network 100 via external network(s) 190. In various embodiments, external network(s) 190 may encompass any suitable combination of networking hardware and protocols necessary to establish network-based communications between client devices 180A-180N and provider network 100. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, both a given client device and the provider network 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the provider network 100. It is noted that in some embodiments, client devices 180A-180N may communicate with provider network 100 using a private network rather than the public Internet.

Figure 6:
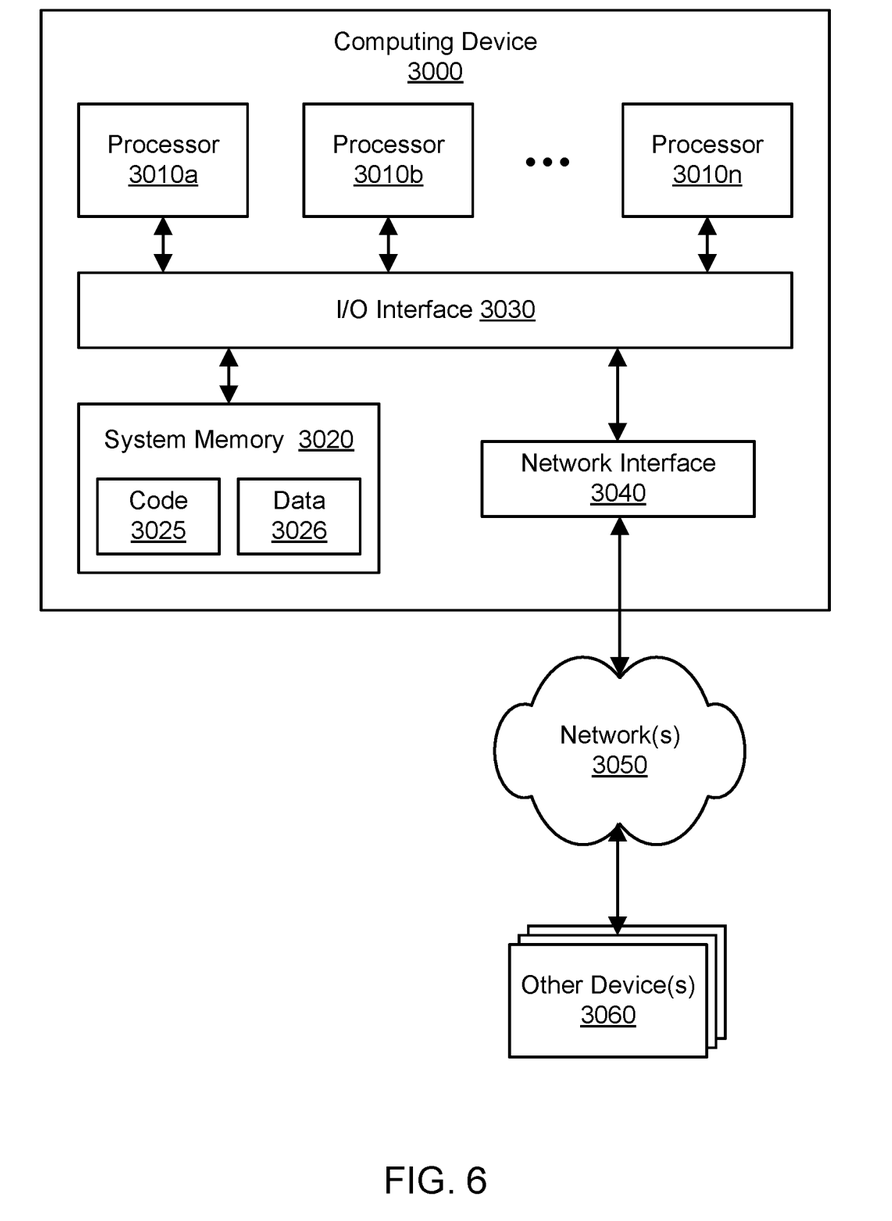
FIG. 6 illustrates an example computing device that may be used in some embodiments.

The provider network 100 may include a plurality of computing devices, any of which may be implemented by the example computing device 3000 illustrated in FIG. 6. In various embodiments, portions of the described functionality of the provider network 100 may be provided by the same computing device or by any suitable number of different computing devices. If any of the components of the provider network 100 are implemented using different computing devices, then the components and their respective computing devices may be communicatively coupled, e.g., via a network. Each of the illustrated components (such as the elastic graphics service 110 and its constituent functionalities 120 and 130) may represent any combination of software and hardware usable to perform their respective functions.

It is contemplated that the provider network 100 may include additional components not shown, fewer components than shown, or different combinations, configurations, or quantities of the components shown. For example, although physical compute instances 142A through 142N are shown for purposes of example and illustration, it is contemplated that different quantities and configurations of physical compute instances may be used. Similarly, although physical GPUs 152A through 152N are shown for purposes of example and illustration, it is contemplated that different quantities and configurations of physical GPUs may be used. Additionally, although three client devices 180A, 180B, and 180N are shown for purposes of example and illustration, it is contemplated that different quantities and configurations of client devices may be used. Aspects of the functionality described herein for providing virtualized graphics processing may be performed, at least in part, by components outside of the provider network 100.

Figure 2A:
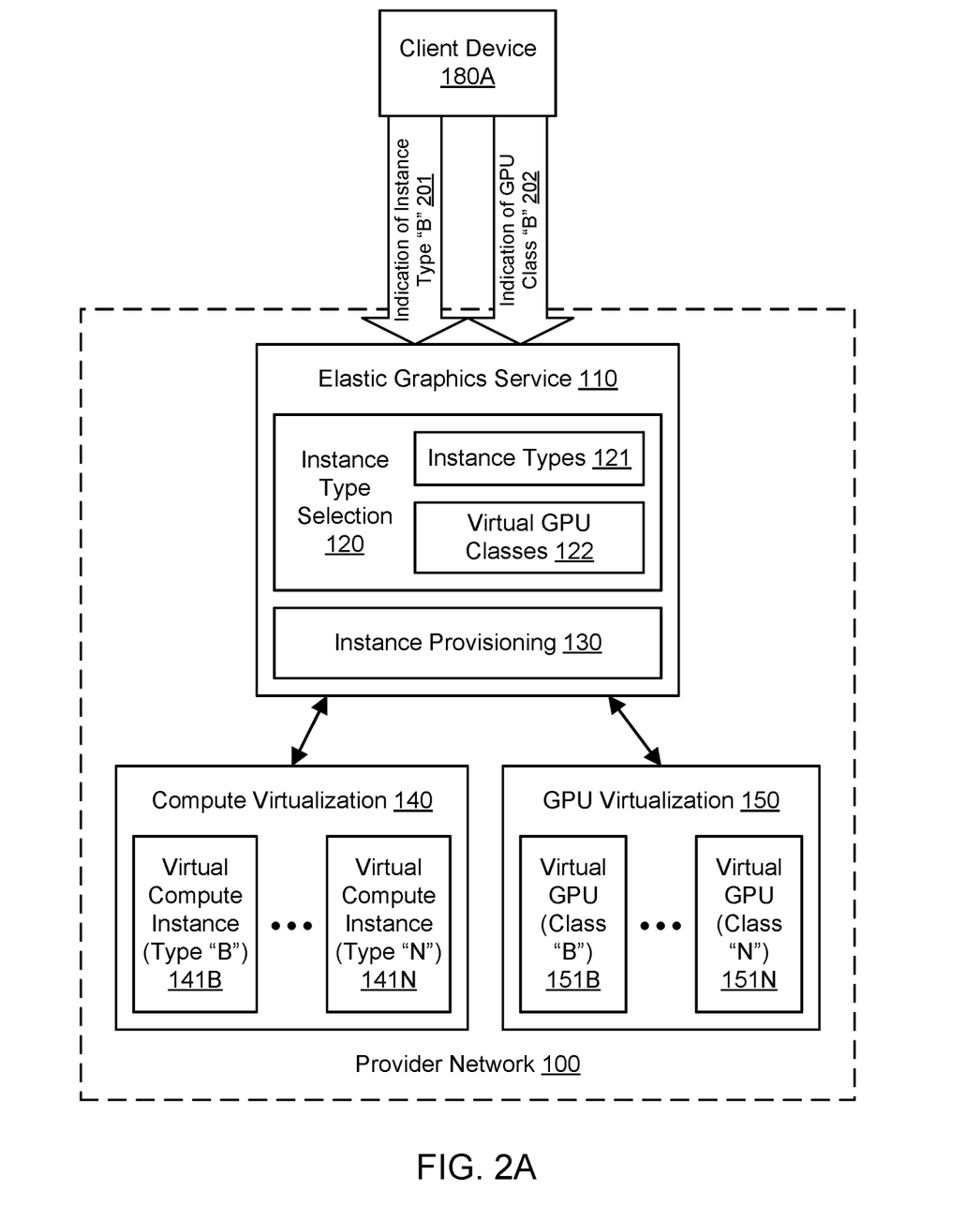
FIG. 2A illustrates further aspects of the example system environment for virtualizing graphics processing in a provider network, including selection of an instance type and virtual GPU class for a virtual compute instance with an attached virtual GPU, according to one embodiment.

FIG. 2A illustrates further aspects of the example system environment for virtualizing graphics processing in a provider network, including selection of an instance type and virtual GPU class for a virtual compute instance with an attached virtual GPU, according to one embodiment. As discussed above, the provider network 100 may offer to the client device 180A a plurality of instance types 121 for virtual compute instances. As shown for purposes of illustration and example, virtual compute instances of type "B" 141B through type "N" 141N may be offered. However, it is contemplated that any suitable number and configuration of virtual compute instance types may be offered to clients by the provider network 100. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, the client device 180A may provide an indication, specification, or other selection 201 of a particular instance type. For example, a client may choose or the instance type "B" from a predefined set of instance types using input 201. As another example, a client may specify the desired resources of an instance type using input 201, and the instance type selection functionality 120 may select the instance type "B" based on such a specification. Accordingly, the virtual compute instance type may be selected by the client or on behalf of the client, e.g., using the instance type selection functionality 120.

As discussed above, the provider network 100 may offer to the client device 180A a plurality of virtual GPU classes 122 for virtual GPUs. As shown for purposes of illustration and example, virtual GPUs of class "B" 151B through class "N" 151N may be offered. However, it is contemplated that any suitable number and configuration of virtual GPU classes may be offered to clients by the provider network 100. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, the client device 180A may provide an indication, specification, or other selection 202 of a particular virtual GPU class. For example, a client may choose the virtual GPU class "B" from a predefined set of virtual GPU classes using input 202. As another example, a client may specify the desired resources of a virtual GPU class using input 202, and the instance type selection functionality 120 may select the virtual GPU class "B" based on such a specification. Accordingly, the virtual GPU class may be selected by the client or on behalf of the client, e.g., using the instance type selection functionality 120.

Figure 2B:
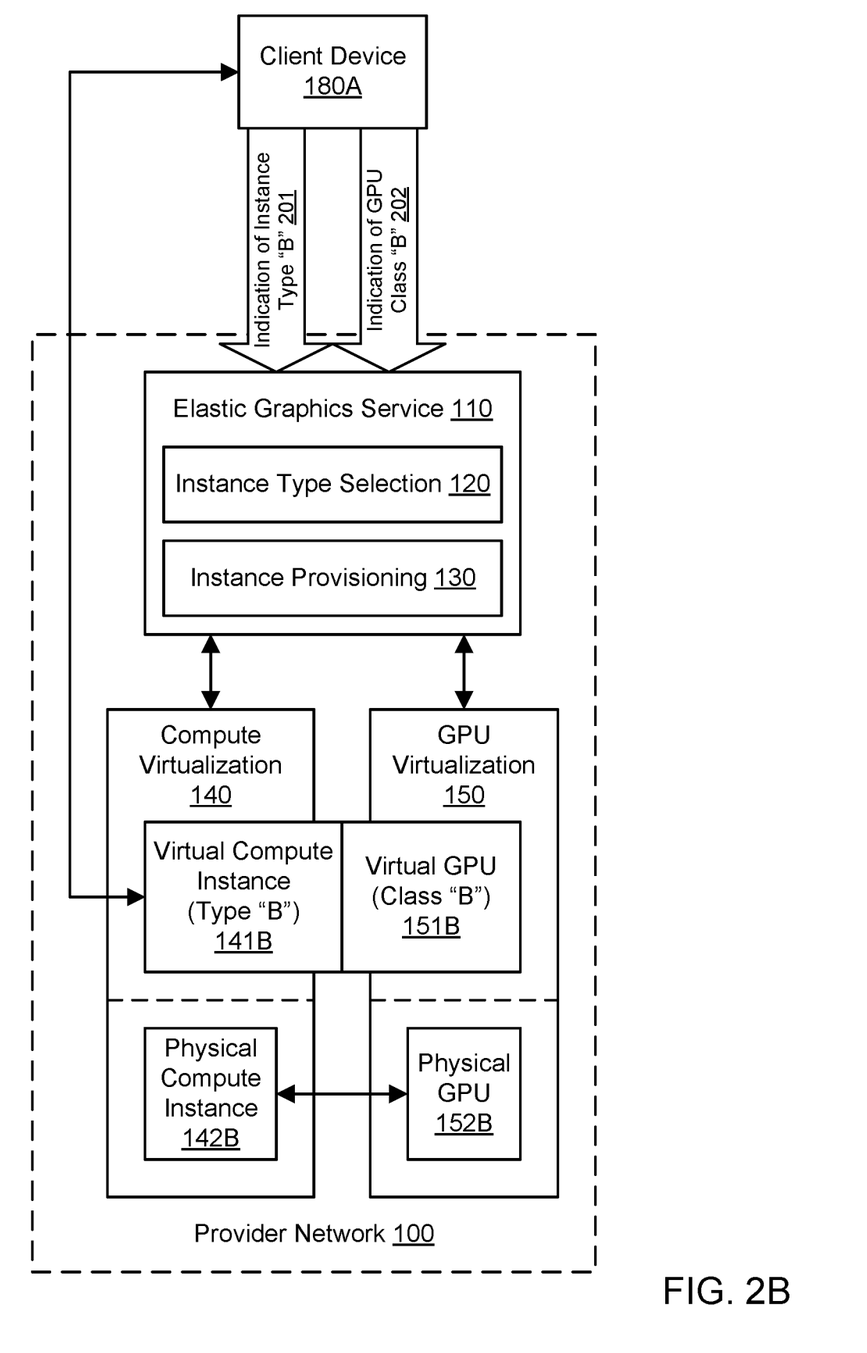
FIG. 2B illustrates further aspects of the example system environment for virtualizing graphics processing in a provider network, including provisioning of a virtual compute instance with an attached virtual GPU, according to one embodiment.

FIG. 2B illustrates further aspects of the example system environment for virtualizing graphics processing in a provider network, including provisioning of a virtual compute instance with an attached virtual GPU, according to one embodiment. The instance provisioning functionality 130 may provision a virtual compute instance 141B with an attached virtual GPU 151B based on the specified instance type "B" and the specified virtual GPU class "B". The provisioned virtual compute instance 141B may be implemented by the compute virtualization functionality 140 using suitable physical resources such as a physical compute instance 142B, and the provisioned virtual GPU 151B may be implemented by the GPU virtualization functionality 150 using suitable physical resources such as a physical GPU 152B. As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client. In one embodiment, a virtual GPU of substantially any virtual GPU class may be attached to a virtual compute instance of substantially any instance type. To implement the virtual compute instance 141B with the attached virtual GPU 151B, a physical compute instance 142B may communicate with a physical GPU 152B, e.g., over a network. The physical GPU 152B may be located in a different computing device than the physical compute instance 142B. Even though they may be implemented using separate hardware, the virtual GPU 151B may be said to be attached to the virtual compute instance 141B, or the virtual compute instance may be said to include the virtual GPU. The virtual GPU 151B may be installed on a device that may reside in various locations relative to the physical GPU 152B, e.g., on the same rack, the same switch, the same room, and/or other suitable locations on the same network. A vendor of the physical GPU 152B may be hidden from the client device 180A.

Figure 3:
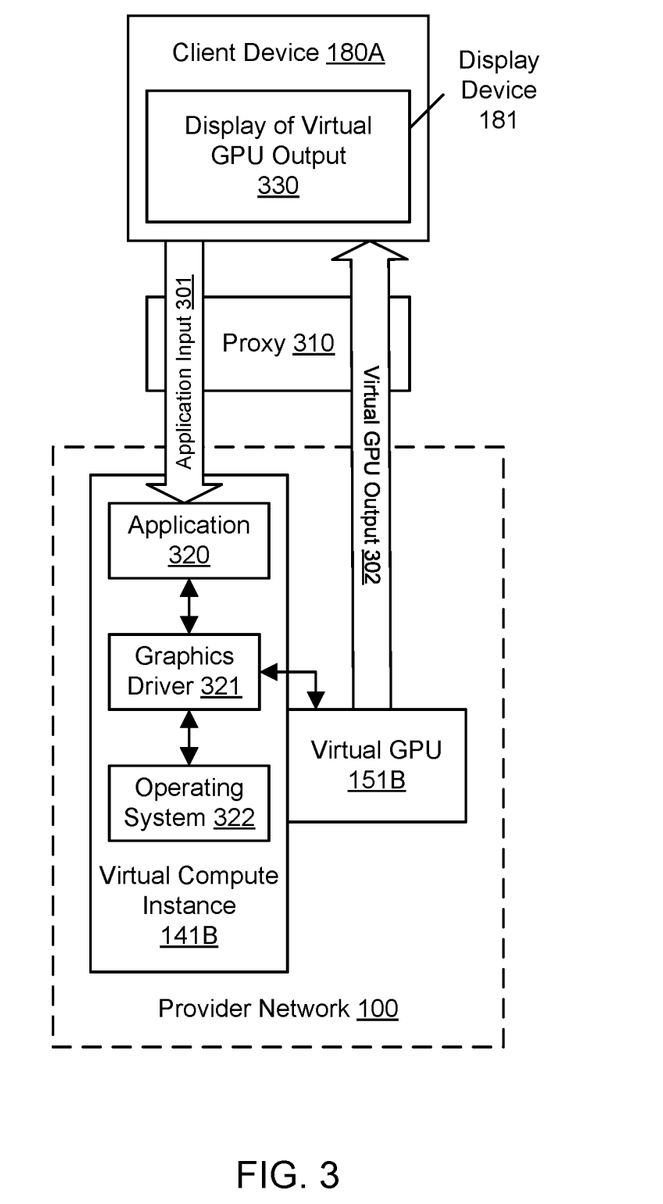
FIG. 3 illustrates the use of a virtual compute instance with a virtual GPU to generate virtual GPU output for display on a client device, according to one embodiment.

FIG. 3 illustrates the use of a virtual compute instance with a virtual GPU to generate virtual GPU output for display on a client device, according to one embodiment. After the virtual compute instance 141B is provisioned with the attached virtual GPU 151B, the client device 180A may use the provisioned instance and virtual GPU to perform any suitable tasks, e.g., based on input from the client device. The virtual compute instance 141B may execute a particular application 320. The application 320 may be selected or provided by the client. The virtual compute instance 141B may also be configured with a particular operating system 322 that provides support for the application 321. Additionally, the virtual compute instance 141B may be configured with a particular graphics driver 321. The graphics driver 321 may interact with the virtual GPU 151B to provide graphics processing for the application 320, including accelerated two-dimensional graphics processing and/or accelerated three-dimensional graphics processing. In one embodiment, the graphics driver 321 may implement a graphics application programming interface (API) such as Direct3D or OpenGL. The graphics driver 321 may represent components running in user mode and/or kernel mode. Additional components (not shown), such as a graphics runtime, may also be used to provide accelerated graphics processing on the virtual compute instance 141B.

The client device 180A may communicate with the virtual compute instance 141B through a proxy 310. Various other communications may be sent through the proxy 310, including for example virtual GPU output 302 from the virtual GPU 151B to the client device 180A. Use of the proxy 310 may hide the address of the virtual compute instance and any associated resources (including a computing device that implements the virtual GPU 151B) from the client device 180A. The proxy 310 and virtual compute instance 141B may communicate using a suitable remoting protocol. In various embodiments, the proxy 310 may or may not be part of the provider network 100. The client device 180A may provide application input 301 to the application 320 running on the virtual compute instance 141B. For example, the application input 301 may include data to be operated upon by the application 320 and/or instructions to control the execution of the application.

Using the graphics processing provided by the virtual GPU 151B, execution of the application may generate virtual GPU output 302. The virtual GPU output 302 may be provided to the client device 180A, e.g., from the virtual GPU 151B or virtual compute instance 141B. In one embodiment, the virtual GPU output 302 may be sent from the virtual GPU 151B (e.g., from a computing device that includes the virtual GPU) to the client device 180A while bypassing the rest of the virtual compute instance 141B (e.g., the underlying physical compute instance 142B). The virtual GPU output 302 may also be sent to the client device 180A through the proxy 310. The proxy 310 and virtual GPU 151B may communicate using a suitable remoting protocol. In one embodiment, the virtual GPU output 302 may be returned to the virtual compute instance 141B, and the virtual compute instance may send the virtual GPU output to the client device 180A. In one embodiment, the client device 180A may forward the virtual GPU output 302 to another component.

In one embodiment, a display device 181 associated with the client device 180A may present a display 330 of the virtual GPU output 302. In one embodiment, the virtual GPU output 302 may include pixel data, image data, video data, or other graphical data. In one embodiment, the virtual GPU output 302 may drive a full-screen display on the display device 181. Portions of the virtual GPU output 302 may be streamed to the client device 180A over time. In one embodiment, the virtual GPU output 302 may be composited with one or more other sources of graphical data to produce the display 330. In one embodiment, the virtual GPU 151B may be used for general-purpose computing (e.g., GPGPU computing), and the virtual GPU output 302 may not include pixel data or other graphical data. In various embodiments, the client device 180A may process or transform all or part of the virtual GPU output 302 before displaying the output. For example, a CPU, GPU, or co-processor on the client device 180A may transform portions of the virtual GPU output 302 and display the results on the display device 181.

In various embodiments, any suitable technique(s) may be used to offload graphics processing from a virtual compute instance to a physical GPU. In one embodiment, an API shim may intercept calls to a graphics API and marshal the calls over a network to an external computing device that includes a physical GPU. In one embodiment, a driver shim may surface a proprietary driver to the virtual compute instance, intercept calls, and marshal the calls over a network to an external computing device that includes a physical GPU. In one embodiment, a hardware shim may surface a hardware interface to the virtual compute instance and marshal attempts by the instance to interact with the physical GPU.

Figure 4:
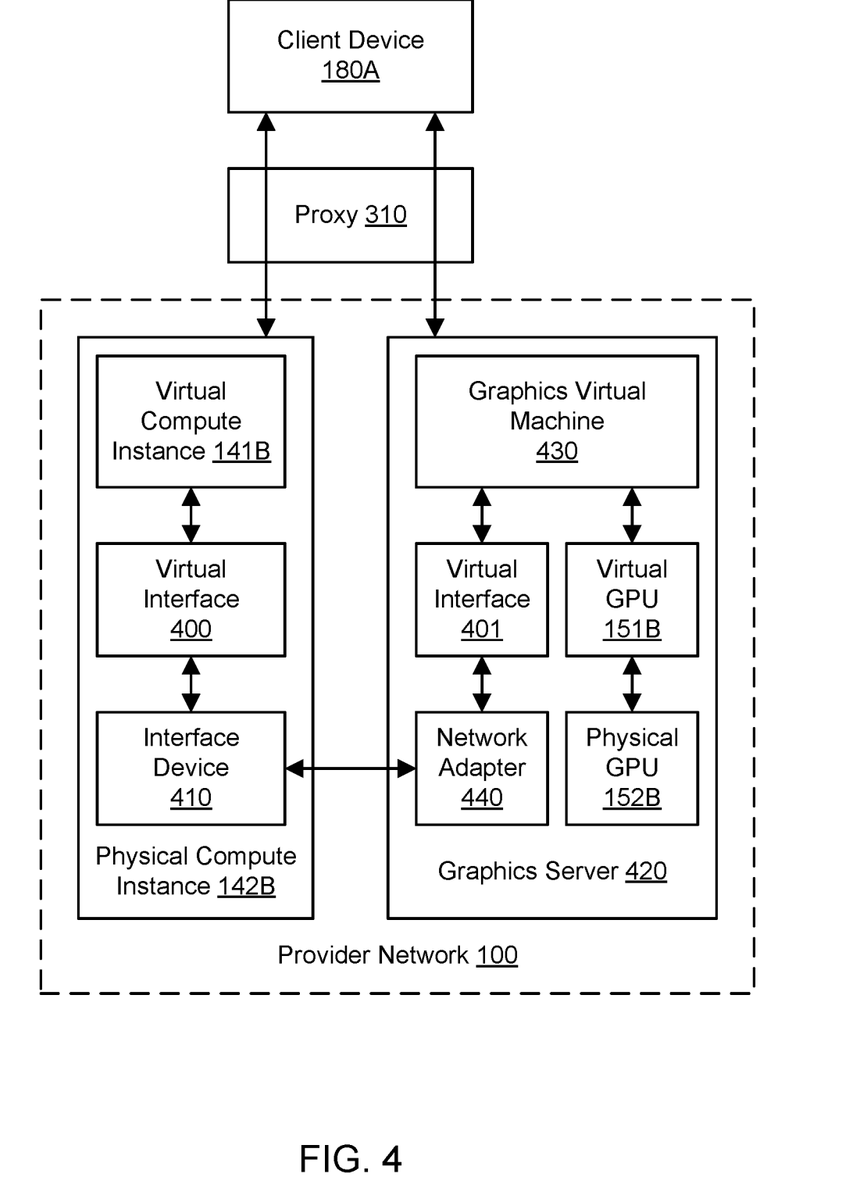
FIG. 4 illustrates an example hardware architecture for implementing virtualized graphics processing, according to one embodiment.

FIG. 4 illustrates an example hardware architecture for implementing virtualized graphics processing, according to one embodiment. In one embodiment, the virtual compute instance 141B may be implemented using a physical compute instance 142B, and the virtual GPU 151B attached to that instance 141B may be implemented using a separate and distinct computing device termed a graphics server 420. The virtual compute instance 141B may use a virtual interface 400 to interact with an interface device 410. The virtual interface 400 may enable the virtual compute instance 141B to send and receive network data. The interface device 410 may include a network interface and a custom hardware interface. Via the custom hardware interface, the interface device 410 may run program code to emulate a GPU interface and appear to the virtual compute instance 141B to implement or include the virtual GPU 151B. In one embodiment, the interface device 410 may present a graphics API to the virtual compute instance 141B and receive API calls for graphics processing (e.g., accelerated 3D graphics processing). Via the network interface, the interface device 410 may communicate with the graphics server 420 (and thus with the physical GPU 152B) over a network. The interface device 410 may be implemented in any suitable manner, e.g., as an expansion card (such as a PCI Express card) or attached peripheral device for the physical compute instance 142B. The interface device 410 may use single root I/O virtualization to expose hardware virtual functions to the virtual compute instance 141B. In one embodiment, the physical compute instance 142B may implement a plurality of virtual compute instances, each with its own virtual interface, and the virtual compute instances may use the interface device 410 to interact with the corresponding virtual GPUs on one or more graphics servers. The physical compute instance 142B may communicate with the proxy 310 using a suitable remoting protocol, e.g., to send data to and receive data from the client device 180A.

Graphics offload performed by the interface device 410 (e.g., by executing custom program code on the interface device) may translate graphics API commands into network traffic (encapsulating the graphics API commands) that is transmitted to the graphics server 420, and the graphics server 420 may execute the commands on behalf of the interface device. The graphics server 420 may include a network adapter 440 that communicates with the interface device 410 (e.g., with the network interface of the interface device) over a network. In one embodiment, the interface device 410 may receive calls to a graphics API (using the custom hardware interface) and generate graphics offload traffic to be sent to the network adapter 440 (using the network interface). The graphics server 410 may implement a graphics virtual machine 430. Any suitable technologies for virtualization may be used to implement the graphics virtual machine 430. In one embodiment, the graphics virtual machine 430 may represent a generic virtual machine that is GPU-capable and is dedicated to providing accelerated graphics processing using one or more virtual GPUs. The graphics virtual machine 430 may be coupled to the network adapter 440 using a virtual interface 401. The virtual interface 401 may enable the graphics virtual machine 430 to send and receive network data. The graphics virtual machine 430 may implement the virtual GPU 151B using the graphics processing capabilities of the physical GPU 152B. In one embodiment, the physical GPU 152B can be accessed directly by the graphics virtual machine 430, and the physical GPU 152B can use direct memory access to write to and read from memory managed by the graphics virtual machine. In one embodiment, the graphics server 420 may implement a plurality of virtual GPUs (such as virtual GPU 151B) using one or more physical GPUs (such as physical GPU 152B), and the virtual GPUs may interact with the corresponding virtual compute instances on one or more physical compute instances over a network. The graphics server 420 may communicate with the proxy 310 using a suitable remoting protocol, e.g., to send data to and receive data from the client device 180A. For example, the graphics server 420 may generate virtual GPU output based on the commands sent from the interface device 410. The virtual GPU output may be provided to the client device 180A through the proxy 310, e.g., from the physical compute instance 142B or graphics server 420.

Figure 5:
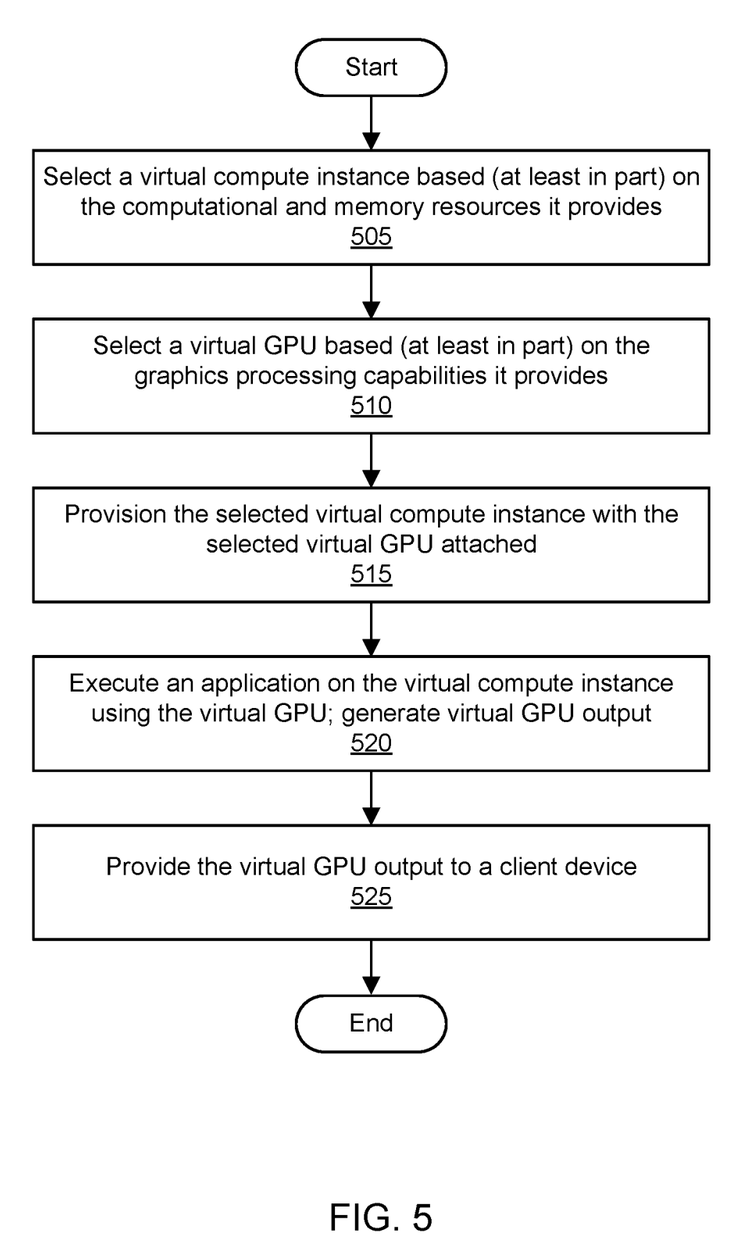
FIG. 5 is a flowchart illustrating a method for virtualizing graphics processing in a provider network, according to one embodiment.

FIG. 5 is a flowchart illustrating a method for virtualizing graphics processing in a provider network, according to one embodiment. As shown in 505, a virtual compute instance may be selected. The virtual compute instance may be selected based (at least in part) on computational and memory resources provided by the virtual compute instance. For example, the virtual compute instance may be selected based (at least in part) on a selection of an instance type by a user. As shown in 510, a virtual GPU may be selected. The virtual GPU may be selected based (at least in part) on graphics processing capabilities provided by the virtual GPU. For example, the virtual GPU may be selected based (at least in part) on a selection of a virtual GPU class by a user. The virtual compute instance and virtual GPU may also be selected based (at least in part) on availability of resources in a resource pool of a provider network that manages such resources. In one embodiment, an elastic graphics service may receive the specifications for and/or selections of the virtual compute instance and virtual GPU.

As shown in 515, the selected virtual compute instance may be provisioned with the selected virtual GPU attached. In one embodiment, the elastic graphics service may interact with one or more other services or functionalities of a provider network, such as a compute virtualization functionality and/or GPU virtualization functionality, to provision the instance with the virtual GPU. The virtual compute instance may be implemented using central processing unit (CPU) resources and memory resources of a physical compute instance. The virtual GPU may be implemented using a physical GPU. The physical GPU may be attached to a different computing device than the computing device that provides the CPU resources for the virtual compute instance. The physical GPU may be accessible to the physical compute instance over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

As shown in 520, an application may be executed on the virtual compute instance using the virtual GPU. Execution of the application may include execution of instructions on the virtual compute instance (e.g., on the underlying physical compute instance) and/or virtual GPU (e.g., on the underlying physical GPU). Execution of the application using the virtual GPU may generate virtual GPU output, e.g., output produced by executing instructions or otherwise performing tasks on the virtual GPU. As shown in 525, the virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device. Execution of the application using the virtual GPU may include graphics processing (e.g., acceleration of three-dimensional graphics processing) for the application using a graphics API.

Illustrative Computer System

In at least some embodiments, a computer system that implements a portion or all of one or more of the technologies described herein may include a general-purpose computer system that includes or is configured to access one or more computer-readable media. FIG. 6 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI)

bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 6 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a plurality of virtual compute instances, implemented using respective central processing unit (CPU) resources and memory resources of a plurality of physical compute instances of a provider network, wherein the plurality of virtual compute instances exceeds the plurality of physical compute instances in number;
a host comprising one or more physical graphics processing units (GPUs) that implement a plurality of virtual GPUs that are accessible to the virtual compute instances over the provider network, the one or more physical GPUs distinct from the plurality of physical compute instances that implements the virtual compute instances, wherein the plurality of virtual GPUs exceeds the one or more physical GPUs in number; and
one or more computing devices configured to implement a multi-tenant elastic graphics service configured to:
receive, from a plurality of different clients of the multi-tenant elastic graphics service, respective provisioning requests individually comprising requirements to provision respective virtual compute instances with respective attached virtual GPUs, wherein responsive to receiving an individual request of the respective provisioning requests, the multi-tenant elastic graphics service is configured to:
communicate via the provider network to provision a virtual compute instance of the plurality of virtual compute instances, including to reserve computational and memory resources of a physical compute instance of the plurality of physical compute instances for the virtual compute instance and to launch an operating system for the virtual compute instance;
communicate via the provider network to provision a virtual GPU of the plurality of virtual GPUs using the one or more physical GPUs distinct from the physical compute instance for the virtual compute instance; and
attach the provisioned virtual GPU to the provisioned virtual compute instance to provide for the physical compute instance to communicate with the one or more physical GPUs over the provider network, wherein subsequent to attaching the provisioned virtual GPU to the provisioned virtual compute instance, the provisioned virtual compute instance is configured to:
begin executing an application on behalf of the respective client using the respective virtual GPU attached during the provisioning;
wherein the virtual compute instance and the virtual GPU are both provisioned and attached in response to the individual request.

2. The system as recited in claim 1,
wherein the provider network comprises another host comprising one or more other physical graphics processing units (GPUs) that implement another plurality of virtual GPUs;
wherein the other plurality of virtual GPUs are organized into a plurality of virtual GPU classes, each class having distinct capabilities for graphics processing;
the system further comprising:
an interface of the elastic graphics service configured to receive selection of a virtual GPU class from the plurality of virtual GPU classes.

3. The system as recited in claim 1, further comprising:
a device comprising a network interface and a hardware interface, wherein a given one of the virtual GPUs is accessible to a given virtual compute instance via the device, wherein the device appears to the given virtual compute instance to comprise the given virtual GPU via the hardware interface, and wherein the device communicates with a physical GPU that implements the virtual GPU via the network interface.

4. The system as recited in claim 1 wherein, to execute the application using the respective virtual GPU, the respective virtual compute instance is configured to provide graphics processing using a graphics application programming interface (API).

5. The system as recited in claim 1 wherein prior to attaching a respective virtual GPU of the plurality of the virtual GPUs to a respective virtual compute instance, the elastics graphics service is further configured to:
receive, from a client device, a selection of a virtual GPU class; and
select one or more of the plurality of the virtual GPUs based at least in part on the selected virtual GPU class.

6. The system as recited in in claim 1, wherein the one or more physical GPUs are attached to a different computing device than one or more computing devices that provide the CPU resources for the respective virtual compute instances.

7. A computer-implemented method, comprising:
provisioning a plurality of virtual compute instances within a multi-tenant provider network, wherein the provider network comprises a plurality of computing devices configured to implement the plurality of virtual compute instances, and wherein the plurality of virtual compute instances exceeds the plurality of computing devices in number;
receiving respective requests from a plurality of different clients of the multi-tenant provider network individually comprising requirements to provision respective virtual compute instances with respective attached virtual GPUs, and responsive to an individual request of the respective provisioning requests:
communicating via the provider network to provision a virtual compute instance of the plurality of virtual compute instances, including to reserve computational and memory resources of a computing device of the plurality of computing devices for the virtual compute instance and to launch an operating system for the virtual compute instance;
communicating via the provider network to provision a virtual GPU of a plurality of virtual GPUs, wherein the plurality of virtual GPUs are implemented via a host comprising one or more physical GPUs, the one or more physical GPUs distinct from the plurality of computing devices configured to implement the plurality of virtual compute instances, wherein the plurality of virtual GPUs exceeds the one or more physical GPUs in number, and wherein the one or more physical GPUs are accessible to the plurality of virtual compute instances over the provider network; and
attaching the provisioned virtual GPU to the provisioned virtual compute instance to provide for the computing device to communicate with the one or more physical GPUs over the provider network;
wherein the virtual compute instance and the virtual GPU are both provisioned and attached in response to the individual request; and
begin executing, by the provisioned virtual compute instance subsequent to attaching the provisioned virtual GPU to the provisioned virtual compute instance, an application on behalf of the respective client using the respective virtual GPU attached during the provisioning.

8. The method as recited in claim 7, further comprising, the respective one or more virtual GPUs outputting image information.

9. The method as recited in claim 7, further comprising:
transmitting virtual GPU output to a client device from one of the virtual compute instances or from one of the virtual GPUs.

10. The method as recited in claim 7,
wherein the provider network comprises another plurality of virtual GPUs;
wherein the other plurality of virtual GPUs are organized into a plurality of virtual GPU classes, each class having distinct computational resources or memory resources for graphics processing;
the method further comprising:
receiving via an interface, selection of a virtual GPU class from a plurality of virtual GPU classes.

11. The method as recited in claim 7, wherein said executing the application comprises the respective virtual compute instance providing graphics processing using a graphics application programming interface (API).

12. The method as recited in claim 7,
wherein the one or more physical GPUs are accessible to the plurality of virtual compute instances over the network via one or more devices comprising a network interface and a hardware interface;
wherein the one or more devices appear to the virtual compute instances to comprise the virtual GPU via the hardware interface; and
wherein each of the one or more devices communicate with a respective physical GPU that implements the virtual GPU via the network interface.

13. The method as recited in claim 7, further comprising:
prior to provisioning one of the virtual compute instances:
selecting a virtual GPU class for one or more of the virtual GPUs from a plurality of virtual GPU classes, wherein the virtual GPU classes vary in respective computational resources or memory resources, and wherein the virtual GPU class is selected based at least in part on the respective computational resources or memory resources provided by the virtual GPU class.

14. One or more non-transitory computer-readable storage media storing program instructions executable on or across one or more processors to perform:
provisioning a plurality of virtual compute instances within a multi-tenant provider network, wherein the provider network comprises a plurality of computing devices configured to implement the plurality of virtual compute instances, and wherein the plurality of virtual compute instances exceeds the plurality of computing devices in number;
receiving respective requests from a plurality of different clients of the multi-tenant provider network individually comprising requirements to provision respective virtual compute instances with respective attached virtual GPUs, and responsive to an individual request of the respective provisioning requests:
communicating via the provider network to provision a virtual compute instance of the plurality of virtual compute instances, including to reserve computational and memory resources of a computing device of the plurality of computing devices for the virtual compute instance and to launch an operating system for the virtual compute instance;
communicating via the provider network to provision a virtual GPU of a plurality of virtual GPUs, wherein the plurality of virtual GPUs are implemented via a host comprising one or more physical GPUs, the one or more physical GPUs distinct from the plurality of computing devices configured to implement the plurality of virtual compute instances, wherein the plurality of virtual GPUs exceeds the one or more physical GPUs in number, and wherein the one or more physical GPUs are accessible to the plurality of virtual compute instances over the provider network; and
attaching the provisioned virtual GPU to the provisioned virtual compute instance to provide for the computing device to communicate with the one or more physical GPUs over the provider network; and
begin executing, by the provisioned virtual compute instance subsequent to attaching the provisioned virtual GPU to the provisioned virtual compute instance, an application on behalf of the respective client using the respective virtual GPU attached during the provisioning;
wherein the virtual compute instance and the virtual GPU are both provisioned and attached in response to the individual request.

15. The one or more non-transitory computer-readable storage media as recited in claim 14, comprising further program instructions executable on or across one or more processors to perform:
prior to provisioning one or more of the virtual compute instances:
receiving, from a client device, a selection of a virtual compute instance class; and
selecting one or more of the plurality of virtual compute instances based at least in part on the selected compute instance class.

16. The one or more non-transitory computer-readable storage media as recited in claim 14, comprising further program instructions executable on or across one or more processors to perform:
prior to provisioning one or more of the virtual compute instances:
receiving, from a client device, a selection of a virtual GPU class; and
selecting one or more of the virtual GPUs based at least in part on the selected virtual GPU class.

17. The one or more non-transitory computer-readable storage media as recited in claim 14, comprising further program instructions executable on or across one or more processors to perform:
prior to provisioning one or more of the virtual compute instances:
selecting a virtual GPU class for one or more of the virtual GPUs from a plurality of virtual GPU classes, wherein the virtual GPU classes vary in respective computational resources or memory resources, and wherein the virtual GPU class is selected based at least in part on the respective computational resources or memory resources provided by the virtual GPU class.

18. The one or more non-transitory computer-readable storage media as recited in claim 14, comprising further program instructions executable on or across one or more processors to perform:
receiving via an interface, selection of a virtual GPU class from a plurality of virtual GPU classes, wherein the virtual GPUs are organized into a plurality of virtual GPU classes, each class having distinct computational resources or memory resources for graphics processing.

19. The one or more non-transitory computer-readable storage media as recited in claim 14, wherein to perform said executing the application using the respective one or more virtual GPUs the media comprises further program instructions executable on or across one or more processors to perform:
providing graphics processing using a graphics application programming interface (API).

20. The one or more non-transitory computer-readable storage media as recited in claim 14,
wherein the plurality of virtual compute instances include a plurality of instance types with varying computational resources or memory resources;
wherein the media comprises further program instructions executable on or across one or more processors to perform:
selecting an instance type for the virtual compute instance based at least in part on computational resources or memory resources provided by the instance type.

* * * * *